(12) United States Patent
Byers et al.

(10) Patent No.: US 6,813,329 B1
(45) Date of Patent: Nov. 2, 2004

(54) CRUD-RESISTANT NUCLEAR FUEL CLADDING

(75) Inventors: William A. Byers, Murrysville, PA (US); Dmitry V. Paramonov, Monroeville, PA (US); Milorad B. Dzodzo, Monroeville, PA (US); Zeses E. Karoutas, Simsbury, CT (US); Michael Y. Young, Columbia, SC (US)

(73) Assignee: Westinghouse Electric Copmany LLC, Pittsburgh, PA (US)

( * ) Notice: Subject to any disclaimer, the term of this patent is extended or adjusted under 35 U.S.C. 154(b) by 0 days.

(21) Appl. No.: 10/459,777

(22) Filed: Jun. 12, 2003

(51) Int. Cl.$^7$ .............................................. G21C 3/06
(52) U.S. Cl. ...................... 376/454; 376/410; 376/414; 376/434; 376/443; 376/436; 376/457
(58) Field of Search ............................ 376/434, 454, 376/443, 436, 457, 414, 410

(56) References Cited

U.S. PATENT DOCUMENTS

| | | | | |
|---|---|---|---|---|
| 1,929,444 A | * | 10/1933 | Murray et al. ............... | 165/181 |
| 2,181,927 A | * | 12/1939 | Townsend ................... | 165/147 |
| 3,034,975 A | * | 5/1962 | Beurtheret .................. | 376/408 |
| 3,041,262 A | * | 6/1962 | Jens ........................... | 376/416 |
| 3,164,528 A | * | 1/1965 | White ......................... | 376/450 |
| 3,177,123 A | * | 4/1965 | Andre ......................... | 376/455 |
| 3,282,335 A | * | 11/1966 | De Haller ................... | 165/183 |
| 3,361,640 A | * | 1/1968 | Hassig et al. ............... | 376/434 |
| 3,625,822 A | * | 12/1971 | Mantle ....................... | 376/436 |
| 3,787,286 A | * | 1/1974 | Anthony ..................... | 376/439 |
| 3,798,125 A | * | 3/1974 | Skok .......................... | 376/436 |
| 3,816,247 A | * | 6/1974 | Cayol et al. ................. | 376/445 |
| 3,930,941 A | * | 1/1976 | Meerwald et al. .......... | 376/454 |
| 4,038,138 A | * | 7/1977 | Linning et al. ............. | 376/436 |
| 4,252,613 A | * | 2/1981 | Jabsen ........................ | 376/439 |
| 4,300,630 A | * | 11/1981 | Trojani ....................... | 165/181 |
| 5,026,516 A | * | 6/1991 | Taylor ........................ | 376/416 |
| 5,761,263 A | * | 6/1998 | Uetake et al. .............. | 376/417 |
| 6,005,906 A | * | 12/1999 | Van Swam ................. | 376/417 |

FOREIGN PATENT DOCUMENTS

| | | | |
|---|---|---|---|
| FR | 2503917 | * | 10/1982 |
| JP | 1-195391 | * | 8/1989 |

OTHER PUBLICATIONS

Zmitko et al "Corrosion product deposits on cladding material" EPRI report TP–114132, Dec. 1999, pp. 185–194.*
Wordsworth, Nuclear Fuel Handling, Butterworths Press, London, 1963, pp. 251–256.*
EJ Davis et al., "The Incipience of Nucleate Boiling in Forced Convection Flow", A.I.Ch.E. Journal, Jul. 1966, vol. 12, No. 4, pp. 774–780.
AD Randolph et al., "Theory of Particulate Processes—Analysis and Techniques of Continuous Crystallization", Academic Press, New York, 1971, p103.
P.Jayaweera et al., "Determination of the High Temperature Zeta Potential and pH of Zero Charge of Some Transition Metal Oxides", Colloids and Surfaces A. Physicochemical and Engineering Aspects 85 (1994) 19–27.
DA Palmer et al., "Experimental Study of the Surface Charge and Cation (including Lithium Ion) Binding to the Zirconium Oxide Surfaces", EPRI Robust Fuels Working Group 1 Meeting, Tampa Florida, Feb. 27–28, 2001.

* cited by examiner

*Primary Examiner*—Michael J. Carone
*Assistant Examiner*—John Richardson

(57) ABSTRACT

A crud-resistant nuclear fuel element cladding in which the axial locations that experience nucleate boiling during reactor full power operation are highly polished so that the maximum size of any surface defect on the highly polished surface is approximately 0.1 microns. The remainder of the cladding surface remains unpolished so that crud is more evenly redistributed over the entire fuel cladding surface to limit the thickness of the crud that is formed to less than 35 microns.

15 Claims, 12 Drawing Sheets

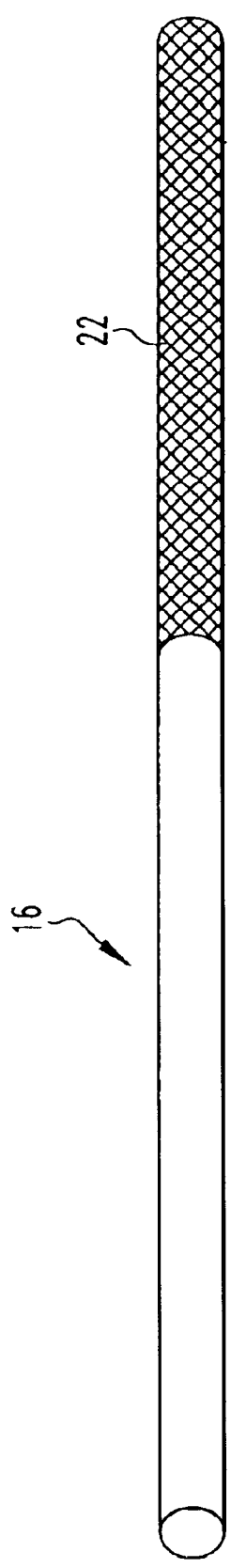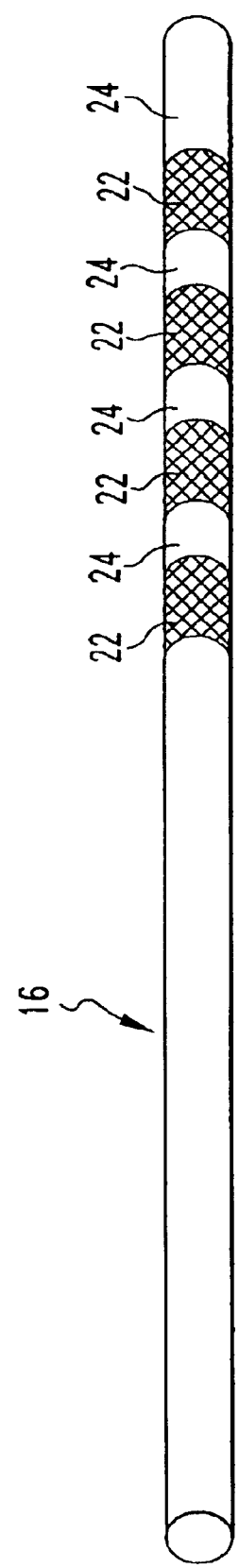

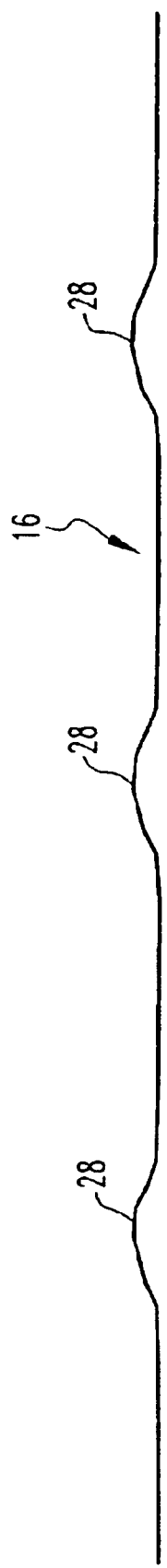
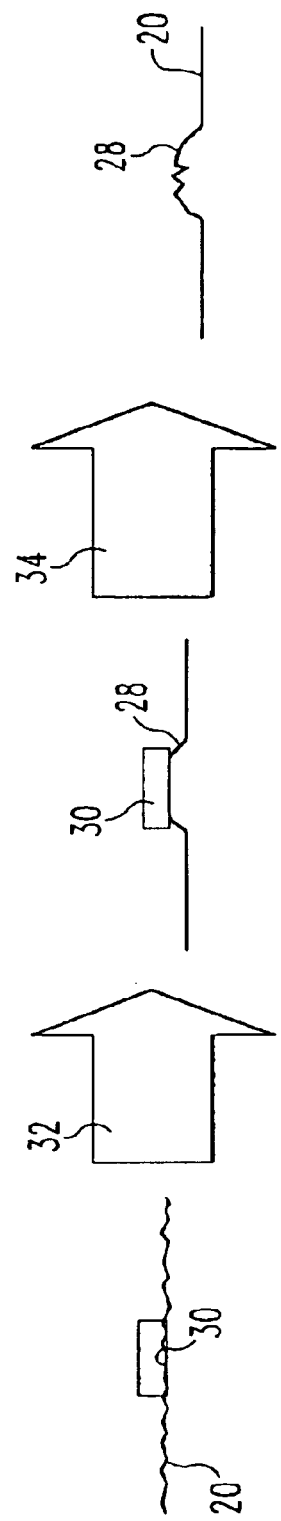

CRUD-RESISTANT NUCLEAR FUEL CLADDING

BACKGROUND OF THE INVENTION

1. Field of the Invention

This invention pertains in general to nuclear fuel element cladding and, more particularly, to a texturized pattern on at least a portion of the nuclear fuel cladding.

2. Related Art

The uranium oxide fuel in a pressurized water reactor ("PWR") is encased in sealed tubes, commonly referred to as the fuel cladding. The cladding maintains the fuel in a position, from which controlled fission can proceed and generate heat. The cladding then transfers the heat from the fuel to pressurized water that circulates around the primary loop of the reactor coolant system. The heated water in the primary loop is used to boil water in a steam generator and the steam is then expanded in a turbine that powers an electrical generator.

The primary loop is pressurized to prevent boiling son the fuel cladding surface. Boiling is undesirable in PWRs because the coolant contains dissolved boric acid and lithium hydroxide. The boron-10 isotope in the boric acid controls the reactor power level by absorbing neutrons. Boiling can alter the boron-10 concentration by selective distribution of the boric acid or its salts between liquid and gas phases. Thus, boiling may cause local changes in the neutron flux and power by producing high local concentrations of boron-10. The lithium hydroxide will also be concentrated at boiling surfaces and depleted from the steam phase. This is undesirable, since lithium hydroxide is used to control pH within a range that is optimal for minimizing corrosion of system materials. Local changes in lithium hydroxide concentration may move the pH of the reactor coolant water outside the optimum pH range, with the result that corrosion is accelerated.

Boiling on a PWR fuel cladding surface is also problematic because it encourages the deposition of corrosion products on the cladding surfaces. PWR coolant always contains small concentrations of iron, nickel, chromium, zirconium and other metals and metal oxides. These are present in the coolant because of corrosion of the steam generator tubing, the fuel cladding, piping and other materials within the reactor coolant system. Deposits on fuel cladding in a PWR are referred to as "crud". The crud deposited on the fuel surfaces becomes activated and then is transported to other parts of the primary system where unwanted radiation fields develop. Furthermore, the crud further accelerates the boiling process and serves as a site for the collection of boron and lithium compounds.

Despite the possible undesirable consequences of boiling on fuel cladding in PWRs, many U.S. reactors now operate in a mode that produces limited boiling on the cladding in the upper regions of the core. This situation has arisen because the power of fuel assemblies and the temperature of the primary coolant have been increased beyond original design levels to increase electrical output and reduce fuel cost.

The power increases have been small enough to minimize the boiling in the "sub-cooled nucleate" mode. With sub-cooled nucleate boiling, the cladding temperature exceeds the boiling point that was set by the system pressure (typically, 652.7° F. (344.8° C.) at 2250 psi (158.2 Kg cm²)). The temperature of the bulk coolant is below the boiling point so steam bubbles that form on the cladding surface collapse as they grow and contact the cooler bulk water.

Typically, the bubbles in low powered PWR sub-cooled nucleate boiling are small and because they form and collapse so rapidly, deposition of boron and lithium usually does not occur at levels that can be detected. However, at some reactors, higher sub-cooled boiling and thick crud deposits have formed that have amplified the boiling concentration beyond that which is found at a clean surface. Boron deposition has reached high enough levels in some plants to cause flux depressions in the top of the core. In other cases, deposits have caused flux depressions and fuel failure. Applicants' field studies as well as theoretical modeling have shown that deposits over 35 microns thick are required to form boron and lithium rich deposits that flux depressions.

It is, therefore, an object of this invention to provide an improved cladding that prevents the buildup of thick crud on the cladding surfaces, that is crud more than 35 microns thick.

It is a further object of this invention to provide such a cladding that will deposit the crud more evenly over a much larger surface area of the cladding than has heretofore been experienced.

SUMMARY OF THE INVENTION

This invention achieves the foregoing objectives by providing a nuclear fuel assembly having an array of a plurality of axially-extending elongated tubular nuclear fuel elements respectively encapsulating a fissionable material within at least a portion of the interior volume thereof. The surface texture of the cladding varies axially in a prescribed pattern along the cladding. Preferably, the portions of the fuel element cladding that experience sub-cooled nucleate boiling during reactor full power operation that is not insubstantial is polished and the portions of the cladding surface that experience insubstantial or no sub-cooled nucleate boiling during full power reactor operation are abraded, to more evenly distribute the crud over the cladding without incurring deposits in excess of 35 microns.

In one preferred embodiment, the prescribed pattern on the outside of the fuel element cladding extends over the upper third of the axial length of the portion of the cladding encapsulating the fissionable material. Preferably, the polished surface of the prescribed pattern does not have defects in excess of approximately 0.1 microns.

In another preferred embodiment, the polished and abraded surfaces of the cladding alternate in the upper third portion.

In still another embodiment, the abraded axial lengths of the cladding are located substantially at or just above at least some of the grid elevations where spacer grids align the fuel elements in the spaced array.

In an additional embodiment, the polished surfaces include at least one hillock or bump to disrupt the laminar flow of coolant.

BRIEF DESCRIPTION OF THE DRAWINGS

A further understanding of the invention can be gained from the following description of the preferred embodiments when read in conjunction with the accompanying drawings in which:

FIG. 11 is a perspective view of one embodiment of the crud-resistant fuel element cladding of this invention with the shaded area indicating a highly polished surface and the lighter area representing a rough surface finish;

FIG. 12 is a perspective view of a second embodiment of the fuel element cladding of this invention showing the highly polished surface as shaded areas and the rough surface finish as lighter areas;

FIG. 14 is a schematic view of a fuel cladding surface of a third embodiment of this invention;

FIG. 15 is a flow chart representing the manufacturing steps employed for forming the embodiment of FIG. 14;

DESCRIPTION OF THE PREFERRED EMBODIMENT

Figure 1:
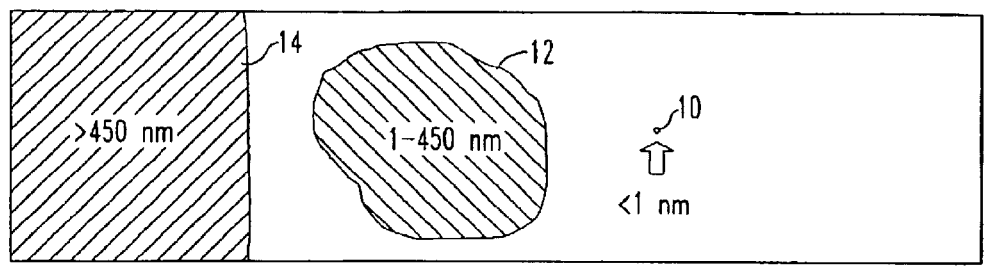
FIG. 1 is a pictorial representation of the classification of corrosion products size in the primary coolant of a pressurized water reactor.

The fuel cladding disclosed in accordance with this invention is designed to prevent the buildup of thick crud, i.e., more than 35 microns thick. The process by which thick crud deposits form is complex. The boiling rate is certainly an important factor. In PWRs with thick crud deposits, the location of the deposits corresponds to locations where boiling is predicted. However, boiling is not the only criteria for the buildup of thick crud on a fuel cladding surface. Calculation of boiling rates for different assemblies in different reactors has shown that, while the plants affected by thick crud have high boiling rates, there are some plants that have significant boiling but have only thin deposits of crud. The other factors affecting crud buildup are set forth below:

Mechanism of Crud Deposition:

The water in a pressurized water reactor contains corrosion products in several forms. The primary elements are iron and nickel, with lesser amounts of chromium and zirconium. These elements are totally dissolved ions, particulates or colloids. A totally dissolved metal consists of a metal ion surrounded by waters of hydration or counter ions such as the borate ion. The metal and its coordination sphere are near 1 nanometer in size. The colloidal corrosion products range between atomic dimensions and 450 nanometers. They are usually composed of metal oxides and their behaviors, such as agglomeration and attachment to surfaces, are strongly influenced by surface chemistry. Colloidal particles will not settle from a quiescent solution because Brownian forces are large compared to gravitational force. Corrosion product particles are larger than 450 nanometers. They are also composed of metal oxides. A pictorial comparison of the sizes of the three types of corrosion products are illustrated in FIG. 1. The dissolved ions in the coolant are represented by reference character 10, the colloids represented by reference character 12 and the metal particles represented by reference character 14.

Figure 2:
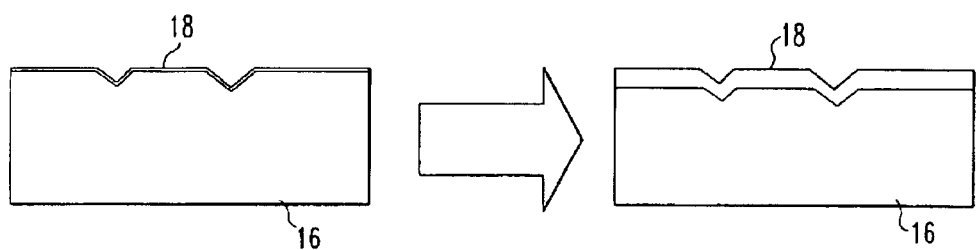
FIG. 2 is a pictorial representation of the growth of oxide in zirconium alloys that preserves the original surface.

The cladding 16, figuratively shown in FIG. 2, is fabricated from zirconium alloys such as ZIRLO™ or Zircaloy-4. These alloys react rapidly with air or water to form a zirconium oxide film 18. The film grows with time, as figuratively depicted by the arrow in FIG. 2. The film's growth within the reactor occurs by diffusion of oxygen through the film to the metal oxide interface. Thus, the original surface characteristics remain largely intact as the cladding oxide 18 thickens over the course of a fuel cycle, as illustrated in FIG. 2. Oxide surfaces have been observed that retain the morphology of the original surface even after two fuel cycles in the reactor (three years).

There are several possible processes by which waterborne corrosion products deposit on the fuel. They include precipitation of totally dissolved metal ions from solution, electrostatic/van der Waal attachment of colloids, and physical entrapment of small particles by the surface. Applicants' study of fuel deposits, mathematical modeling of the deposition process and laboratory investigations of the properties of metal oxides at high temperature have all provided clues to which processes dominate.

Figure 3:
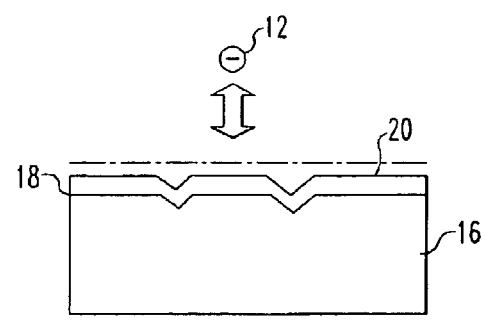
FIG. 3 is a pictorial illustration showing corrosion product colloids and the fuel cladding surface both having negative charges that lead to electrostatic repulsion rather than deposition.

Initial deposition of colloids 12 onto the fuel surface 20 by electrostatic/van der Waal forces is unlikely because the zirconium oxide 18 on the fuel cladding and typical corrosion product oxides all are expected to have negative surface charges. This was suggested by trends in lower temperature laboratory work performed by Jayaweera et al., "Determination of High Temperature Zeta Potential and pH of Zero Charge of Some Transition Metal Oxides", *Colloids and Surfaces A, Physiochemical and Engineering Aspects* 85 (1994) 19–27. More recently, high temperature surface charge studies by NRL on $Fe_3O_4$ and $ZrO_2$ have supported this conclusion (Palmer et al., "Experimental Study of the Surface Charge and Cation (Including Lithium Ion) Binding to Zirconium Oxide Surfaces", EPRI Robust Fuels Working Group I Meeting, Tampa, Fla., Feb. 27–28, 2001). Thus, the forces between colloidal particles 12 in the coolant and the cladding surface 20 will be repulsive as figuratively illustrated in FIG. 3, and deposition is not expected.

Direct deposition of totally dissolved ions onto the zirconium oxide surface 20 by precipitation is unlikely. This is because the crystal structure of the zirconium oxide 18 on the cladding 16 and that of iron, nickel and chromium oxides that might precipitate within the core are quite different. Heterogeneous nucleation of crystals would be required. Heterogeneous nucleation does not occur at low supersaturation levels (Rudolf et al., "Theory of Particulate Processes-Analysis and Techniques of Continuous Crystallization", Academic Press, New York, 1971, p. 103), and supersaturation levels within the core are low. Temperature changes from the bottom to the top of the core with normal coolant chemistry (pH 6.9–7.2) produce supersaturation ratios of 1.08 or lower for both iron and nickel, the major crud components. When sub-cooled nucleate boiling is considered, the surface supersaturation ratio may increase in the laminar layer of flow at the cladding surface due to the affects of boiling, but this affect should increase the supersaturation ratio to only about 1.3. Somewhat higher concentrations may occur briefly in the microlayer under the individual bubbles, but it is unlikely that a crystal could nucleate and then grow to beyond the critical diameter required for stability before the bubble collapses.

Figure 4A:
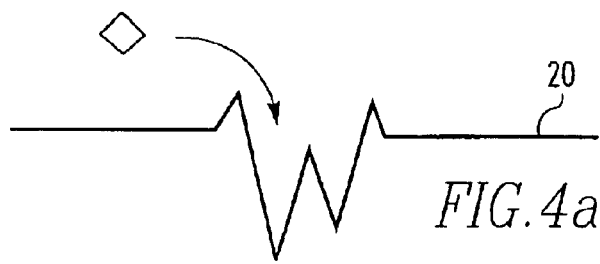
FIGS. 4A through 4D illustrate four steps of the process of crud deposition growth on a PWR fuel cladding.
Figure 4B:
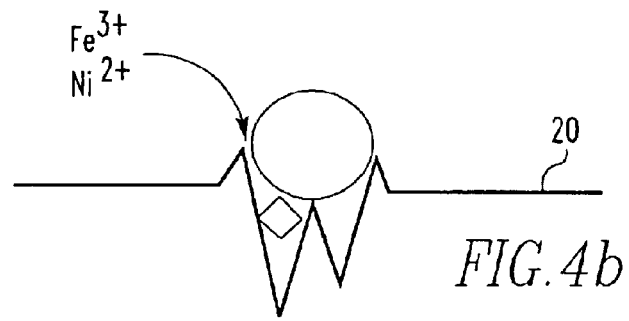
Figure 4C:
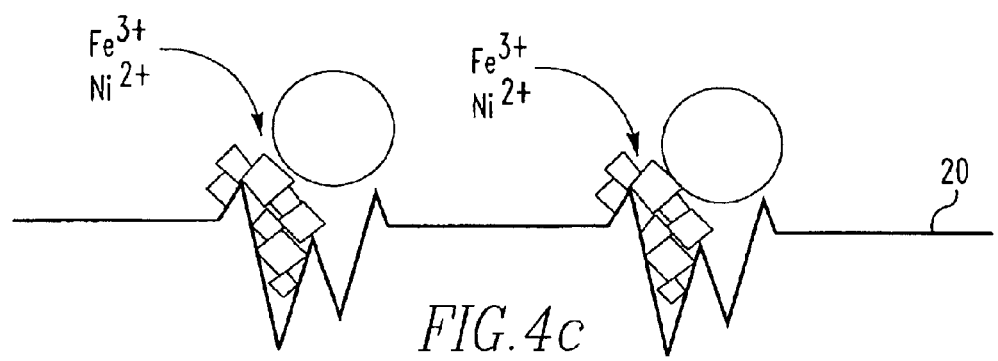
Figure 4D:
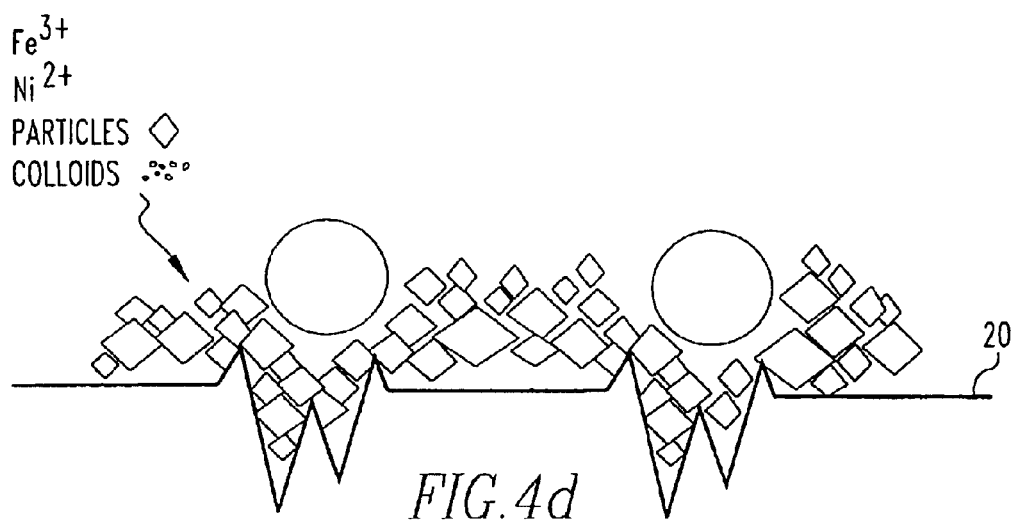

Deposition is most likely to be initiated by physical entrapment of small particles by surface defects. The particles then serve as seeds for further crystal growth, a process that cements the particles in place. Crystal growth can take place with very low super saturation ratios, once a seed is established. Boiling in the vicinity of the defect, which increases the local supersaturation ratio, accelerates the crystal growth process. The boiling occurs in the vicinity of trapped particles because the same defects that trap small particles also serve as boiling nucleation sites. Eventually, clusters of particles around multiple defects grow together to form a continuous deposit layer. The boiling nucleation sites turn into steam chimneys that particles and colloids that are then strained from the fluid. Dissolved ions precipitate as the deposit boiling process increases their concentration. Crystals within the deposit continue to grow in size and further cement the structure in place. The process is illustrated in FIGS. 4A–4D. FIG. 4A figuratively shows a corrosion product particle being detained by a surface defect. FIG. 4B illustrates that sub-cooled boiling at the defect increases the supersaturation level of dissolved metal ions. FIG. 4C illustrates that crystal growth takes place starting with the trapped particles serving as a seed. The original particle is cemented into place as it grows and it anchors daughter particles. FIG. 4D illustrates that the particle's clusters at multiple surface defects grow together to form a continuous deposit layer. Boiling chimneys (steam paths) within the deposit develop and pump more coolant into the deposit. Colloids and particles are added to the deposit and cemented in place by the dissolved ions that precipitate due to the boiling concentration process.

Figure 5:
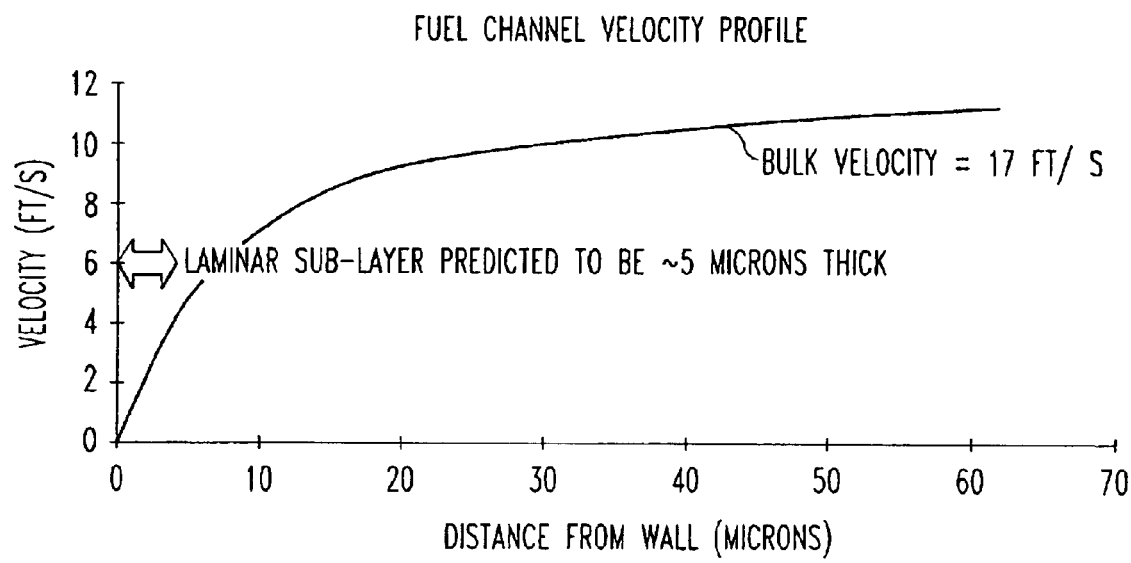
FIG. 5 is a graphical illustration of a typical coolant flow velocity profile normal to the fuel cladding surface in a PWR core.
Figure 6:
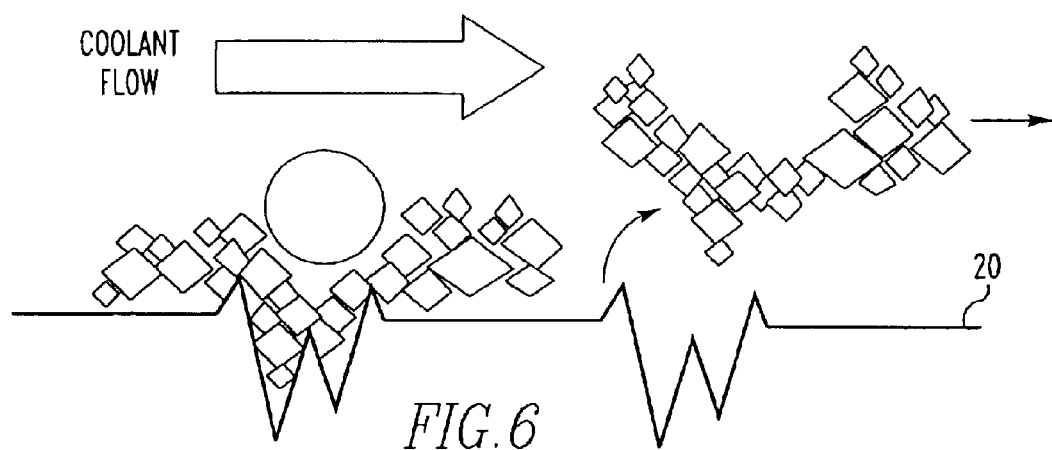
FIG. 6 is a pictorial representation illustrating that deposit growth is limited by flow attrition, which detaches portions of the crud layer.

The growth of the deposit is eventually limited by attrition induced by the primary coolant flow. The flow of the primary coolant in the core of a typical PWR is near 17 feet/second (5.18 meters/second). Even with this high bulk flow, the velocity near the cladding wall is low, and deposits a few microns in thickness will not experience significant shearing force. However, as the deposit increases in thickness, portions of the deposit will extend further into the coolant flow and the shearing force increases. A typical coolant velocity profile is shown in FIG. 5. This force causes parts of the deposit to spall from the surface as figuratively illustrated in FIG. 6. The amount of force a deposit can resist and the limit of its thickness must be a function of how well the deposit is attached to the cladding surface 20. Applicants have found, through examination of crud deposits, that crud deposits are held to the surface at attachment points that occupy a small fraction of the crud cladding interface area. Anchoring the crud within surface scratches and other defects is no doubt an important factor in establishing the ultimate thickness of the deposit. The process of crud deposit growth just described is supported by applicants' studies of crud deposits, some of the results of which are shown in FIGS. 7, 8, 9 and 10.

Figure 7:
FIG. 7 is a computer generated image of a scanning electron micrograph (SEM) image showing crud preferentially deposited on surface scratches and cladding oxide is removed as flakes.
Figure 8:
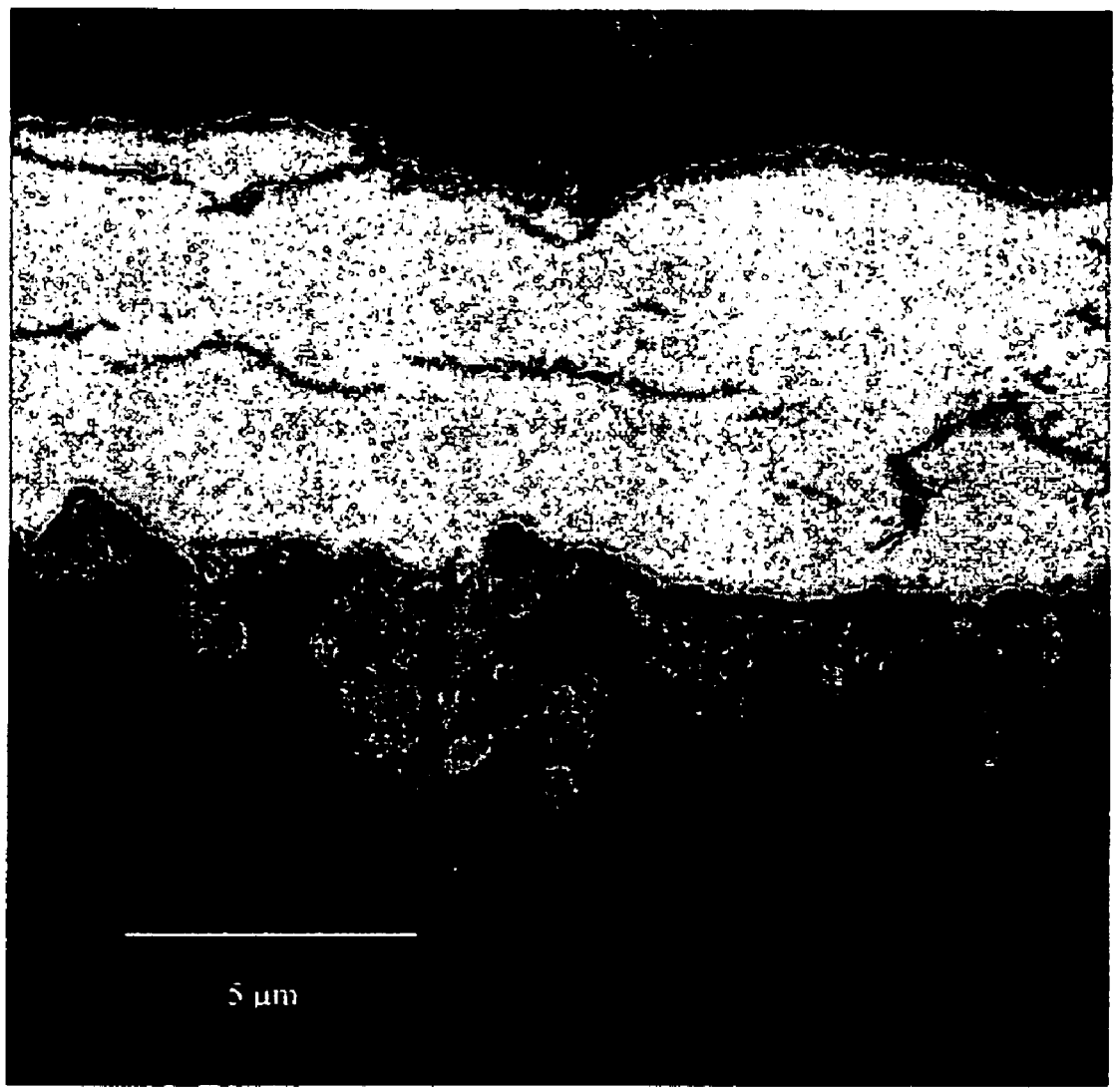
FIG. 8 is a computer generated image of a SEM image of a cross-section of detached cladding showing a thin layer of crud.
Figure 9:
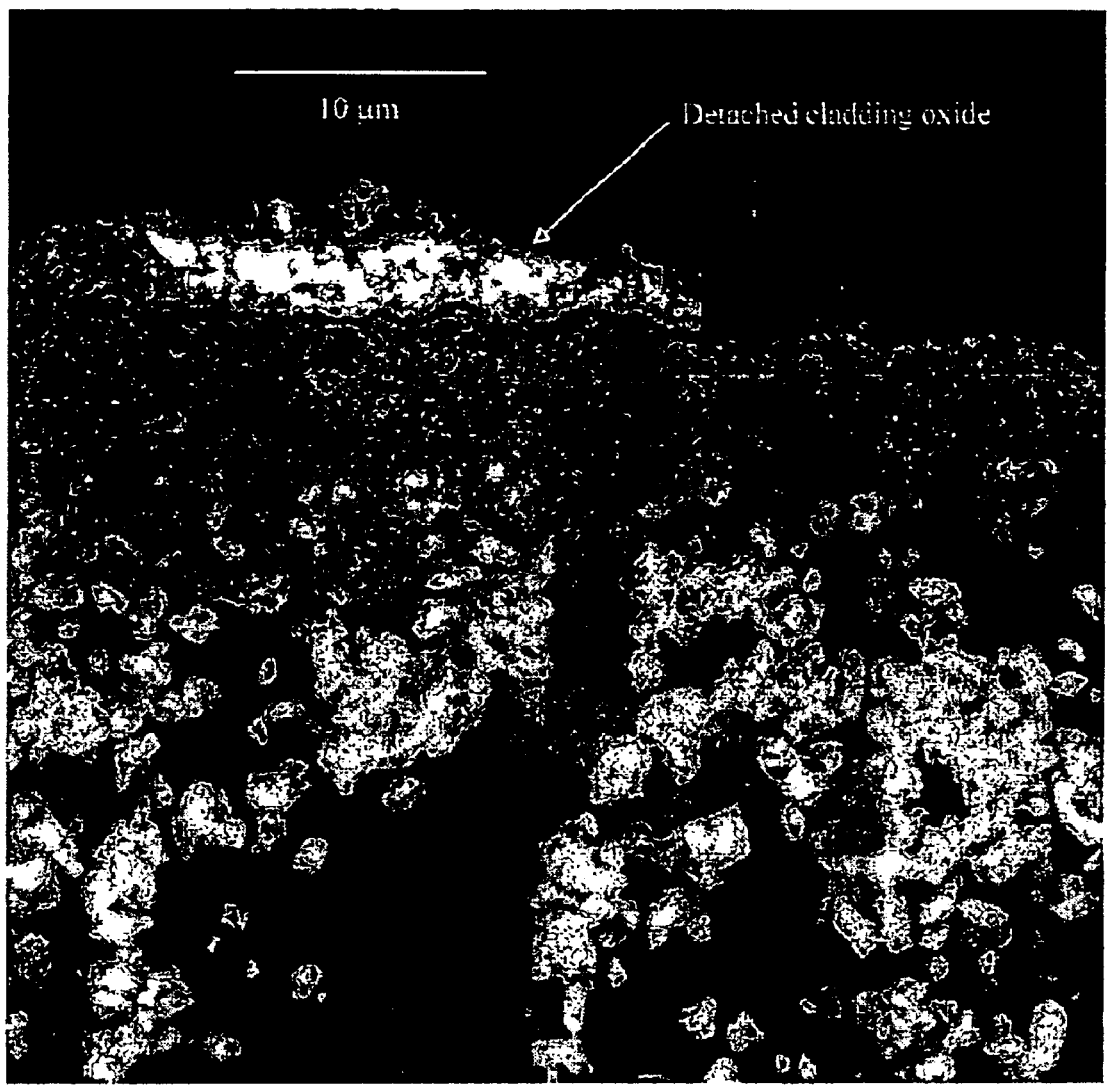
FIG. 9 is a computer generated image of a SEM image of a cross-sectioned crud deposit attached to a small section of the cladding oxide.
Figure 10:
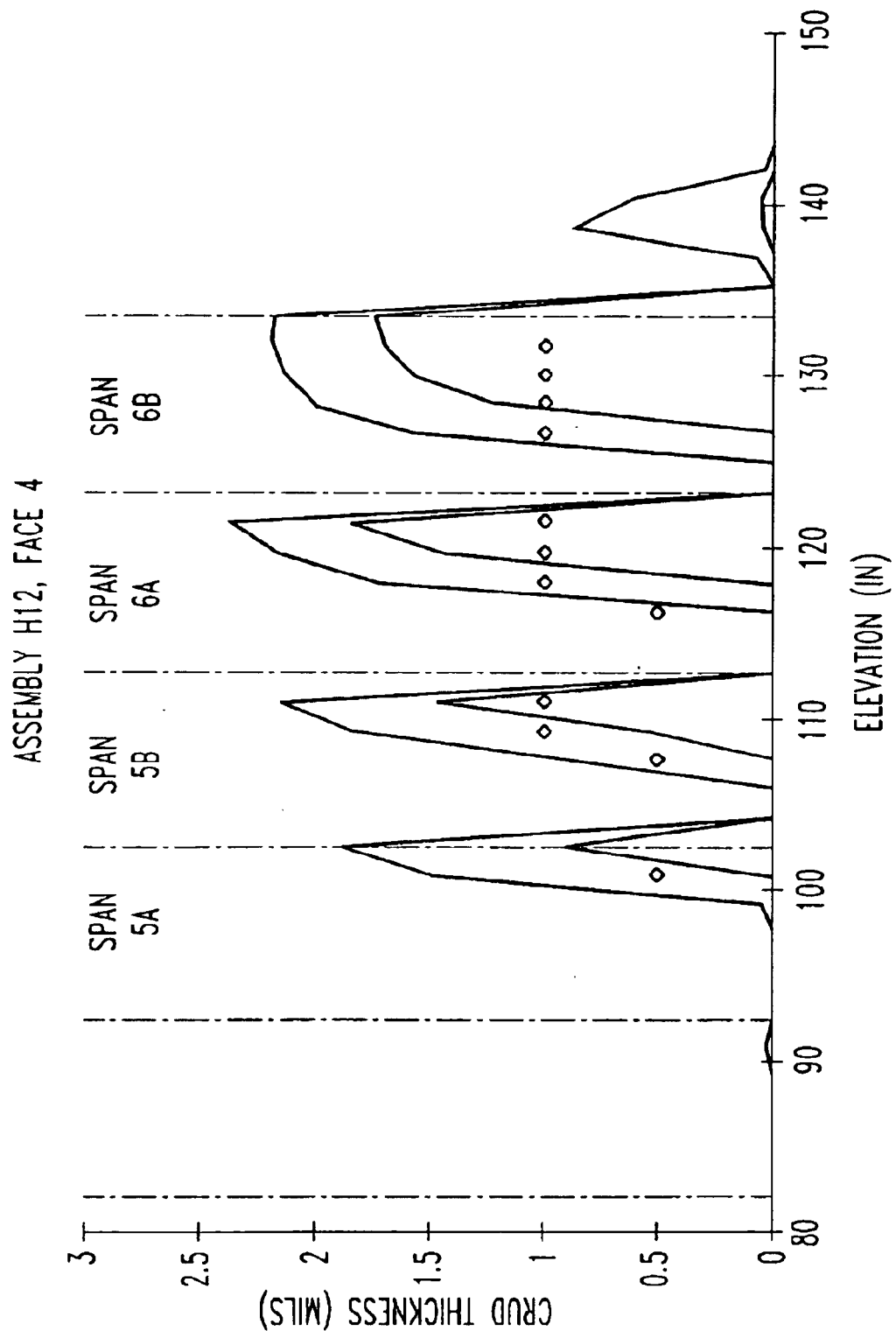
FIG. 10 is a graphical illustration of a prediction of crud thickness from boiling rates and measured average thickness values.

The manufacturing process currently used by cladding manufacturers produces machine marks that run circumferentially around the cladding. The radial grinding process that imparts the final surface finish leaves these grooves or scratches. Crud deposits tend to follow these scratches and outline the scratches in regions where crud deposits are sparse. This observation is shown in FIG. 7 on cladding oxide that was removed from fuel cladding after two fuel cycles. Parallel lines of crud deposits can be clearly seen on some of the removed oxide flakes. FIGS. 7, 8 and 9 are scanning electron micrographs with FIG. 8 showing a cross-section of a detached cladding oxide that shows a thin crud layer projecting towards the bottom of the image. From the micrograph, it can be seen that the crud interlocks with the surface roughness features, but directly contacts the cladding oxide at relatively few places. A cross-section of a thicker crud deposit is shown in FIG. 9. Again, one can note how the deposit follows the features of the cladding oxide, but is not bonded to the cladding oxide directly at many locations. The final observation that is important background for this invention is that crud is not evenly distributed about the reactor core. The crud of any substantial thickness is only found in the top third of the core and is concentrated in spans 5 and 6 between grid locations. Within this section of the core, the thickest crud deposits are found mid-span to just before the spacer grids that hold the fuel rods in place. Surfaces within the grids and immediately after the grids have little or no crud deposits. The crud thickness profile follows the boiling profile. Little boiling occurs just above the grids due to the turbulence established by the grid mixing vanes. Predictions of deposit thickness, based on the boiling rate, match the observed thickness values reasonably well. The predicted thickness values, based on boiling rate and those observed on two typical rods, are shown in FIG. 10 where diamonds illustrate measured values and lines are predicted values for the left and right side of the fuel assembly face.

Crud Resistant Cladding

Crud resistant fuel cladding is fuel cladding with a pattern of surface roughness that has been designed to minimize the buildup of thick crud. The portions of the cladding that now experience high mass evaporation rates in PWR cores are given a high polish. The high polish minimizes crud buildup by eliminating surface defects that trap the small particles that serve as nucleation sites for crud growth. The high polish, that is a polish that eliminates surface defects greater than approximately 0.1 microns, also minimizes crud buildup by changing the character of the sub-cooled boiling that takes place. Sub-cooled boiling is suppressed because of a lack of initiation sites, and when it does occur, the bubbles will form randomly across the surface rather than at fixed locations. When the boiling is more evenly and randomly distributed, the tendency to build up thick patches of crud will be reduced. The high polish will also remove sites that firmly anchor the crud to the cladding. The growth of thick crud will be discouraged since the high shear forces exerted by the fast moving coolant will remove the poorly anchored crud.

While the crud-resistant cladding is given a high polish in the areas that now experience the most sub-cooled nucleate boiling, the areas that have low boiling rates or do not boil are given a coarse finish. These rough-polished areas of the cladding will serve as "getters" for coolant corrosion products. Crud removed from the coolant onto the rough surfaces will not be available for deposition on surfaces where thick crud deposits have been known to develop. Thus, a thinner and more even distribution of crud is achieved. The crud thickness will not exceed 35 microns at any point, and significant amounts of boron and lithium buildup will be avoided.

No surface can be without defects, but the highly polished surface must be smooth enough that any surface defects are small enough to exclude the particulate; matter that is present in a given coolant system. The maximum size for a surface defect on the highly polished surface of crud-resistant cladding is approximately 0.1 microns.

Smaller colloidal particles may be present in the coolant, but surface charge and electrical repulsion and attraction, rather than physical entrapment, dominate their behavior. A maximum limit for surface defect size of approximately 0.1 microns is also suggested by boiling nucleation experience. Davis et al., "The Incipient of Nucleate Boiling in Forced Convection Flow", A.I.Ch.E. Journal 4, 1966 p 774–779, has indicated that surface defects that nucleate sub-cooled boiling are on the order of 1 micron across, so the maximum surface defect size should be well below this value. There are a number of embodiments of crud-resistant cladding that can be employed in accordance with this invention.

In the first embodiment, illustrated in FIG. 11, the high polish is applied to the entire upper portion of the cladding 16, as the shaded area 22. The high polish 22 spans the length of the cladding where thick crud deposition has been observed on high-powered fuel. This would be span 5A and above for the current Westinghouse V5H assembly design. In terms of elevation, cladding more than 95 inches (2.41 meters) from the bottom of the assembly would be highly polished. This represents the upper 37% of the power-producing portion of the fuel element. The entire length of the cladding 16 could also be polished, depending on the specific reactor application.

Figure 13:
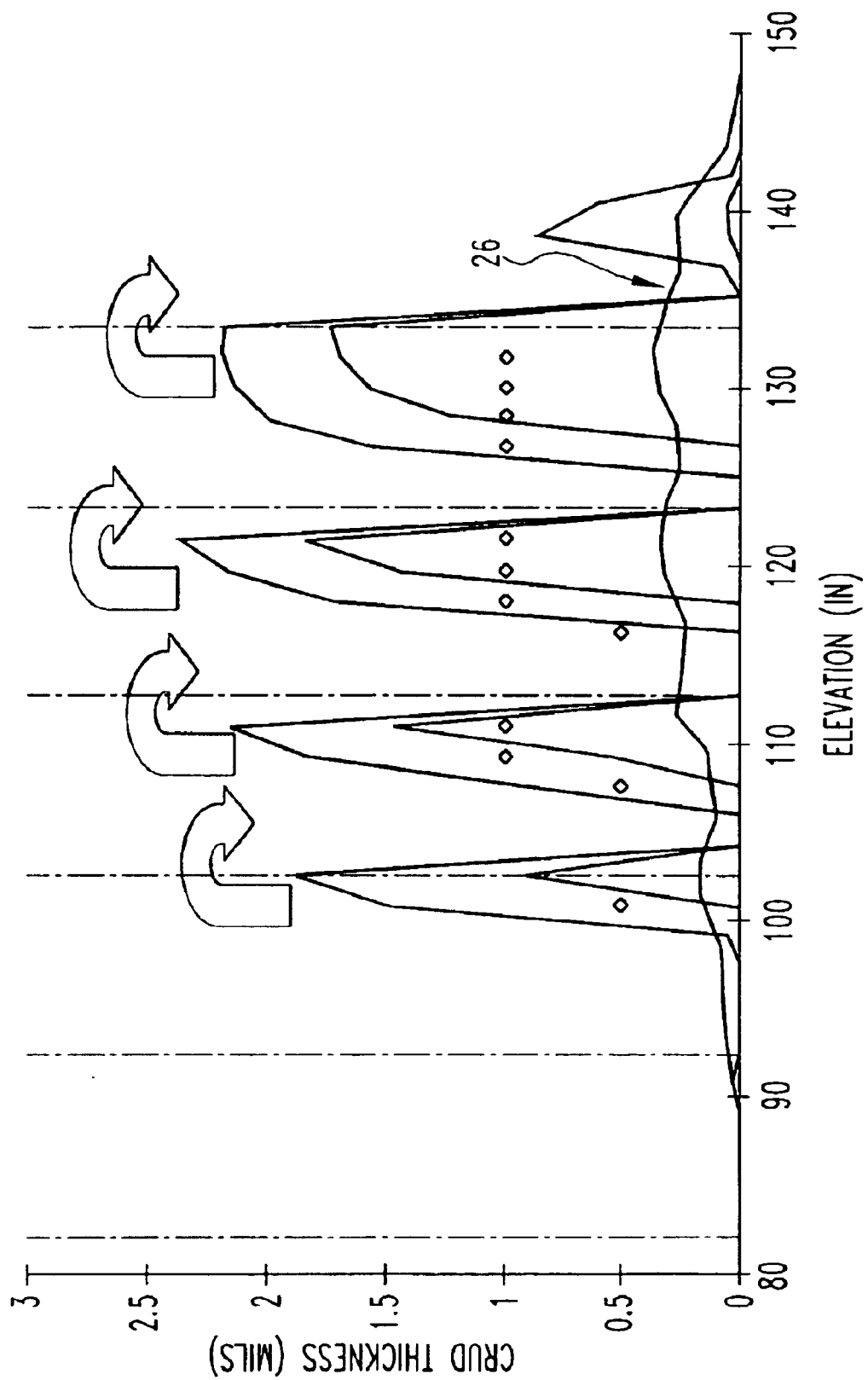
FIG. 13 is a graphical illustration of the predicted affect of the second embodiment of this invention on crud distribution.

A second embodiment is illustrated in FIG. 12, in which the high polish is applied to the upper portion of the cladding, but in a different pattern from the first embodiment in that the polish is applied in bands 22. The polish is applied to only the free-span regions of the cladding between spacer grids where boiling would occur with a rough surface. The surface is left in a rough condition within the grids where the power level is lower and the turbulence is higher than the free-span areas and no boiling occurs. The cladding is also not polished for a short distance above each grid intersection where turbulence induced by the grid vanes improves heat transfer and suppresses boiling. The area shown in FIG. 12 that is not shaded 24 is slightly roughened or abraded. The affect of this surface finish will be to lower the crud deposits in the upper sections of spans 5A, 5B, 6A and 6B while maintaining or increasing the crud thickness within the grids and free-span areas just above the grids. Thus, the critical thickness of 35 microns needed to concentrate lithium and boron to high levels will not be reached and the crud will be more evenly distributed. This effect is graphically illustrated in FIG. 13 which shows the crud thickness from boiling rates in measured average thickness values previously illustrated in FIG. 10, with the predicted affect of the second embodiment on crud distribution superimposed and identified by reference character 26.

In a third embodiment of this invention, portions of the cladding 16 are given a high polish as in the first two embodiments. In addition, small hillocks or bumps 28 are added to the polished section. These hillocks are sized to increase turbulence and disrupt the laminar sublayer of fluid that contacts the cladding. This improves heat transfer with the result that the surface of the tubing is cooler and sub-cooled nucleate boiling is reduced or eliminated. However, the hillocks and the areas surrounding the hillocks are smooth, with no defects larger than approximately 0.1 microns in diameter. Crud buildup is discouraged by the combination of decreased boiling, increased flow turbulence and the lack of particle entrapments sites.

The ideal height of the hillocks is near 12 microns and their diameter is near 37 microns. The distance between the hillocks preferably ranges between 138 and 185 microns. Other hillock sizes and shapes may be used, provided that the turbulence at the surface is increased without providing particle entrapment sites.

The hillocks provide additional benefit by protecting the surrounding polished surface from damage by abrasion. This is particularly true if the hillocks are topped with a hard material with a low co-efficient of friction such as zirconium oxide. This would minimize damage to the fuel cladding when it is loaded into grid assemblies and handling damage would be reduced. Damage by water-borne debris would also be reduced.

There are many ways by which the patterned surfaces described in the first two embodiments of the invention can be produced. Sufficiently smooth surfaces can be produced by mechanical polishing, chemical polishing (pickling), electropolishing and by laser surface melting.

The hillocks can be produced by several means as well. One way is pictorially illustrated by the flow chart shown in FIG. 15. In the process illustrated, a mask 30 that is impervious to a chemical polishing or electropolishing solution, is printed on the surface 20 of the cladding 16 at each location where a hillock 28 is desired. The surface 20 of the cladding 16 is polished to preferably remove 12 microns of material. The mask 30 is then removed in step 34, exposing the underlying hillock 28. The coarse surface of the hillock 28 is thus surrounded by a highly polished surface 20 of the cladding 16.

Figure 16:
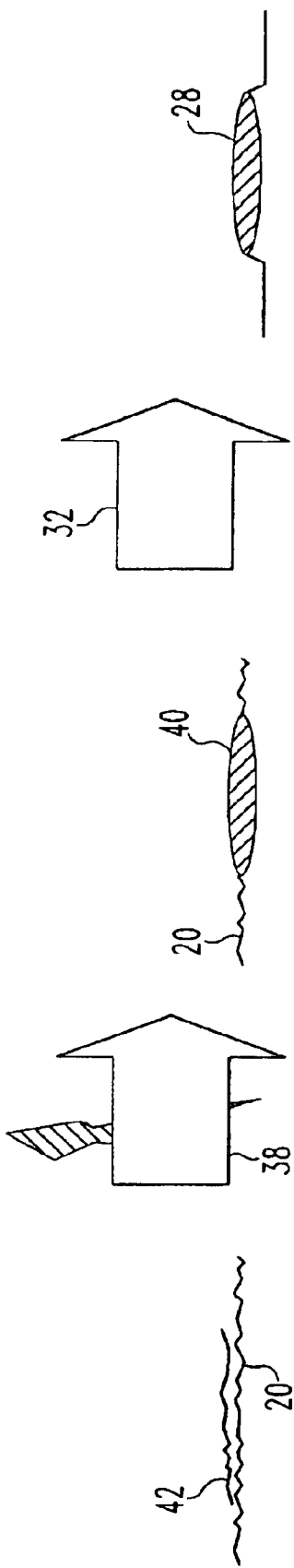
FIG. 16 is a flow chart illustrating the manufacturing steps employed for forming a variation of the embodiment illustrated in FIG. 14.

Another technique for creating the desired hillocks 28 on a highly polished surface 20 is illustrated by the flow chart provided in FIG. 16. Instead of employing a mask 30, shown in the method of FIG. 15, a zirconium oxide spot pattern 40 can be produced on the cladding surface 20 in the area where the desired hillock is to be produced. Electropolishing and chemical polishing solutions attack zirconium oxide at a very slow rate. The hillock 28 that is left will be topped with an abrasion-resistant oxide that will protect the surrounding smooth surface. Laser spot heating in an oxygen containing gas can produce the desired oxide pattern on the cladding surface 20. An arc discharge 38, especially an arc discharge 38 in a conducting aqueous solution 42, can also produce the oxide pattern.

Figure 17:
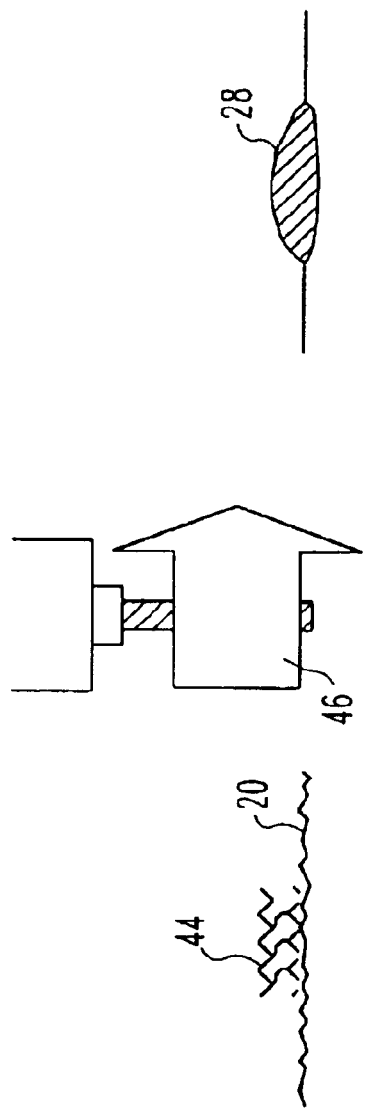
FIG. 17 is a flow chart showing a third alternative for manufacturing the hillocks of the embodiment illustrated in FIG. 14.

A third method illustrated by the flow chart shown in FIG. 17, which provides the most flexible way for producing hillocks surrounded by a highly polished surface, is to employ laser surface melting. In this process, zirconium oxide powder or stabilized zirconium oxide powder is first printed onto the surface 20. The zirconium oxide spot is held in place with a binding agent. The laser 46 is passed across both the oxide 44 and the tubing surface 20 of the cladding 16, producing an abrasion-resistant hillock on a smooth surface.

Thus, a corrosion-resistant coating is produced by refining the cladding surface 20 by polishing or other means so that the maximum size for a surface defect in the areas that are prone to crud collection is approximately 0.1 microns.

Figure 18:
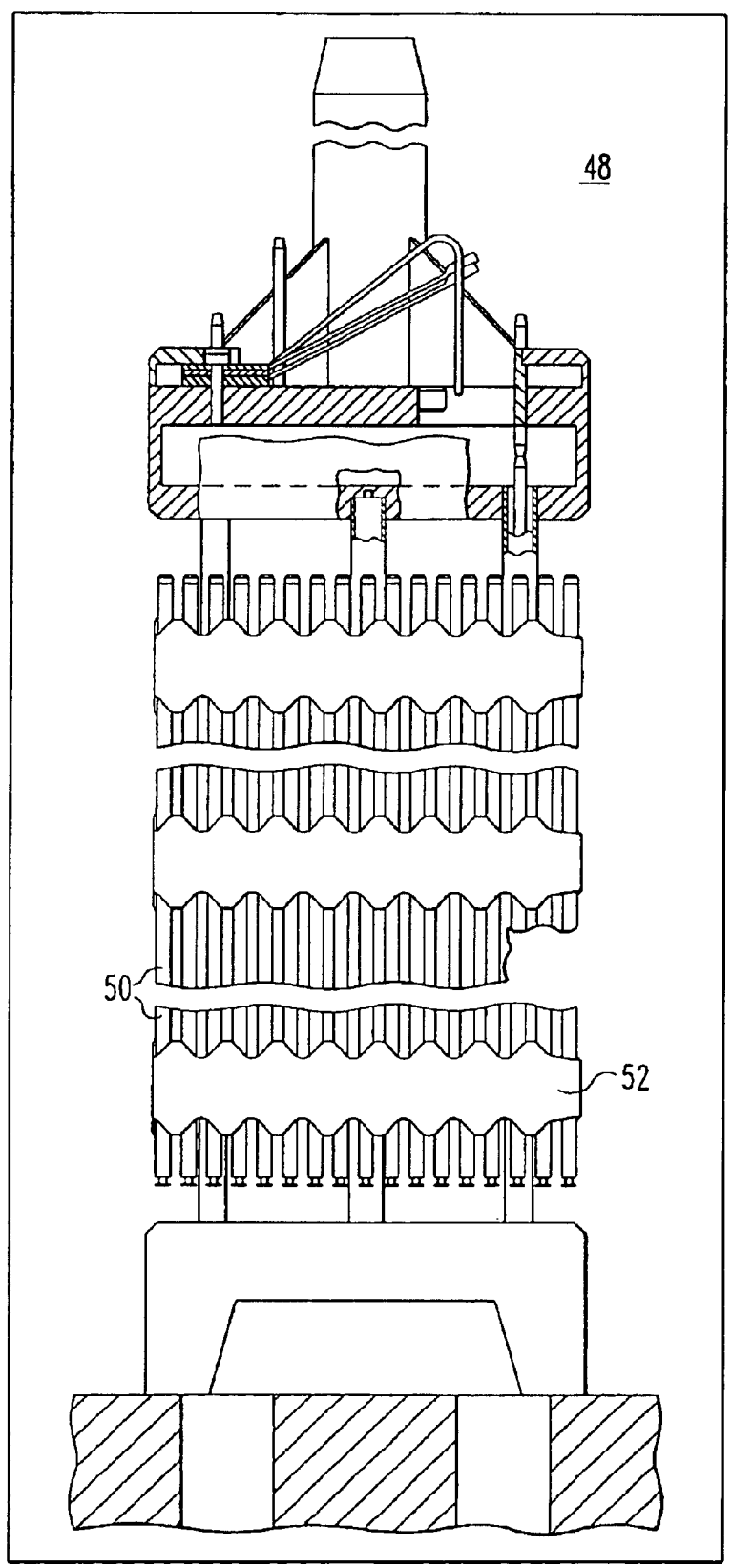
FIG. 18 is an elevational view of a nuclear fuel assembly incorporating the cladding of this invention.

Accordingly, the cladding of this invention can be employed in a fuel assembly 48 as the outer surface of a plurality of fuel elements 50 maintained in a spaced array by the grids 52 as shown in FIG. 18.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear fuel assembly comprising:
   an array of a plurality of axially extending elongated tubular pressurized water reactor nuclear fuel elements having first and second closed ends and encapsulating a fissionable material axially along at least a portion of an interior volume thereof and an exterior of at least one of the fuel elements comprising a cladding that extends substantially axially between the first and second closed ends, and
   a surface texture of said cladding varying axially in a prescribed pattern along at least a portion of an axial length of said cladding, from an abraded surface to a smooth polished surface between the first and second ends to more evenly distribute crud.

2. The nuclear fuel assembly of claim 1 wherein any defects in the polished surface do not substantially exceed 0.1 microns in depth.

3. The nuclear fuel assembly of claim 1 wherein the first closed end of the nuclear fuel element represents an upper end of the nuclear fuel element and the second closed end represents a lower end of the nuclear fuel element and wherein a third of an axial length of the nuclear fuel element housing the fissionable material within the interior volume towards the upper end of the nuclear fuel elements is polished along at least a portion of the axial length thereof.

4. The nuclear fuel assembly of claim 3 wherein the third of the axial length of the nuclear fuel element is approximately 95 inches (241.3 cm) or more axially from the second closed end of the nuclear fuel element.

5. The nuclear fuel assembly of claim 1 including a first plurality of axial lengths of said cladding that are polished and a second plurality of axial lengths of said cladding that are abraded and wherein the first and second plurality of axial lengths alternate.

6. The nuclear fuel assembly of claim 5 wherein the polished and abraded surfaces of the cladding alternate in the upper third of the axial length of the fuel element housing the fissile material.

7. The nuclear fuel assembly of claim 5 including a plurality of axially spaced spacer grids surrounding and affixing the fuel elements in the spaced array wherein said abraded axial lengths of the cladding are located substantially at or just above at least some of the grid elevations.

8. The nuclear fuel assembly of claim 1 wherein the polished surface includes at least one hillock or bump.

9. The nuclear fuel assembly of claim 8 wherein the hillock or bump is sized to increase turbulence and disrupt in the axial direction the laminar sub-layer of a coolant fluid that contacts the cladding during reactor operation.

10. The nuclear fuel assembly of claim 8 wherein the height of the hillocks is approximately 12 microns.

11. The nuclear fuel assembly of claim 1 wherein the abraded surfaces are formed at axial locations along the fuel assembly that experience substantial or no sub-cooled nucleate boiling during full power reactor operation.

12. The nuclear fuel assembly of claim 3 wherein each axial length of the fuel element that experiences sub-cooled nucleate boiling during reactor full power operation is not insubstantial is polished.

13. The nuclear fuel assembly of claim 8 wherein the hillocks are coated with Zirconium Oxide.

14. A nuclear fuel assembly comprising:
    an array of a plurality of axially extending elongated tubular pressurized water reactor nuclear fuel elements having first and second closed ends and encapsulating a fissionable material axially along at least a portion of an interior volume thereof and an exterior of at least one of the fuel elements comprising a cladding that extends substantially axially between the first and second closed ends;
    a surface texture of said cladding varying axially in a prescribed pattern alone at least a least a portion of an axial length of said cladding, from an abraded surface to a smooth polished surface, between the first and second ends to more evenly distribute crud; and
    wherein the polished surface includes at least one hillock or bump and the diameter of the hillocks is approximately 37 microns.

15. A nuclear fuel assembly comprising:
    an array of a plurality of axially extending elongated tubular pressurized water reactor nuclear fuel elements having first and second closed ends and encapsulating a fissionable material axially along at least a portion of an interior volume thereof and an exterior of at least one of the fuel elements comprising a cladding that extends substantially axially between the first and second closed ends;
    a surface texture of said cladding varying axially in a prescribed pattern along at least a least a portion of an axial length of said cladding, from an abraded surface to a smooth polished surface, between the first and second ends to more evenly distribute crud; and
    wherein the polished surface includes at least one hillock or bump including a plurality of hillocks or bumps wherein the distance between the hillocks or bumps ranges approximately between 138 and 185 microns.

* * * * *